US012052401B1

(12) United States Patent
Janzen et al.

(10) Patent No.: US 12,052,401 B1
(45) Date of Patent: *Jul. 30, 2024

(54) SYSTEMS AND METHODS FOR DIGITALLY WATERMARKING RESOURCES PRODUCED BY AN ONLINE SOFTWARE PLATFORM

(71) Applicant: Avalara, Inc., Seattle, WA (US)

(72) Inventors: Mark Janzen, Wichita, KS (US); Anthony Ungerman, Boca Raton, FL (US)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,429

(22) Filed: Jun. 2, 2023

Related U.S. Application Data

(63) Continuation of application No. 17/684,823, filed on Mar. 2, 2022, now Pat. No. 11,706,369.

(51) Int. Cl.
*H04N 1/32* (2006.01)
*G06T 1/00* (2006.01)

(52) U.S. Cl.
CPC ....... *H04N 1/32272* (2013.01); *G06T 1/0021* (2013.01)

(58) Field of Classification Search
CPC ............ H04N 1/32272; H04N 1/32144; G06T 1/0021
See application file for complete search history.

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |
| 8,620,578 B1 | 12/2013 | Brown et al. | |
| 8,725,407 B2 | 5/2014 | Hurley et al. | |
| 9,760,915 B2 | 9/2017 | Pavlou et al. | |
| 10,445,818 B1 | 10/2019 | Chowdhary | |
| 10,769,611 B2 | 9/2020 | McNeel | |
| 2002/0138765 A1 | 9/2002 | Fishman et al. | |
| 2007/0136158 A1 | 6/2007 | Rawlings et al. | |
| 2007/0136159 A1 | 6/2007 | Rawlings et al. | |
| 2013/0013471 A1 | 1/2013 | Fishman | |
| 2021/0334929 A1* | 10/2021 | He | G06T 1/005 |

* cited by examiner

*Primary Examiner* — Christopher Wait
(74) *Attorney, Agent, or Firm* — Jeremiah J. Baunach; Frontier IP Law PLLC

(57) ABSTRACT

Systems and methods electronically uniquely imprint a digital watermark on produced resources, such as on data or electronic documents produced by an online software platform (OSP), in nearly invisible ways that are likely to survive subsequent processing. In one embodiment the OSP stores a plurality of resource digital rules used for producing resources for respective relationship instances of primary entities with other entities; receives a dataset on behalf of a primary entity, in which the dataset includes data representing a relationship instance between the primary entity and a secondary entity; in response to the received dataset, produces a resource based on applying one or more of the plurality of resource digital rules to the dataset; and digitally watermarks the produced resource with a digital watermark such that the produced resource is identifiable via the digital watermark as having been produced by the OSP.

17 Claims, 9 Drawing Sheets

| WATERMARK TECHNIQUE IDENTIFIER | WATERMARK TECHNIQUE |
|---|---|
| WATERMARK TECHNIQUE 1 | SUBSTITUTE UNICODE CHARACTERS IN CERTAIN DATA |
| WATERMARK TECHNIQUE 2 | SUBSTITUTE UNICODE CHARACTERS IN TAX CODES |
| WATERMARK TECHNIQUE 3 | ADJUSTING DATES BY INCONSEQUENTIAL AMOUNTS OF TIME |
| WATERMARK TECHNIQUE 4 | ADJUSTING CURRENCY AMOUNTS BY LESS THAN CURRENCY RELEVANT AMOUNTS |
| WATERMARK TECHNIQUE 5 | ADJUSTING GEO-COORDINATES WITH AN INTENTIONAL ERROR |
| WATERMARK TECHNIQUE 6 | GENERATING A CRYPTOGRAPHIC CODE BASED ON THE PRODUCED RESOURCE |
| . | . |
| . | . |
| . | . |

FIG. 6

SYSTEMS AND METHODS FOR DIGITALLY WATERMARKING RESOURCES PRODUCED BY AN ONLINE SOFTWARE PLATFORM

TECHNICAL FIELD

The technical field relates to computer networks and security, and particularly to networked automated systems for digitally watermarking produced resources.

BRIEF SUMMARY

Using a variety of techniques as described herein, alone or in combination, an online software platform (OSP) uniquely imprints a digital watermark on resources it produces (e.g., data or electronic documents the OSP provides or furnishes) in nearly invisible ways that are likely to survive subsequent processing, and thus increases the usefulness, accuracy and speed of digital watermarking and subsequent automated detection of data produced by the OSP. Such a digital watermark is likely to be blindly copied from system to system downstream of the OSP producing the resource. Later, upon being confronted with external data, the OSP may authenticate the external data as originating from the OSP, or being an exact copy of data originating from the OSP, by electronically checking the external data for the digital watermark. Such digital watermarking techniques may be used to increase data security (e.g., data loss prevention), for example, by guarding against competitors of the OSP secretly using the service of the OSP to improve the accuracy of their own calculations. Digital watermarking techniques may be achieved by leaving an identifying distortion in the data that is too small to be noticed by many downstream systems.

Therefore, the systems and methods described herein for digitally watermarking resources produced by an OSP improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks and existing computerized systems to facilitate availability, accuracy and efficiency of computing resources to perform digital watermarking.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 6 is a sample view of an electronic data structure associating electronic watermark identifiers with respective watermark techniques that they identify in a use case according to various embodiments of the present disclosure, and is an improvement in automated computerized systems.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
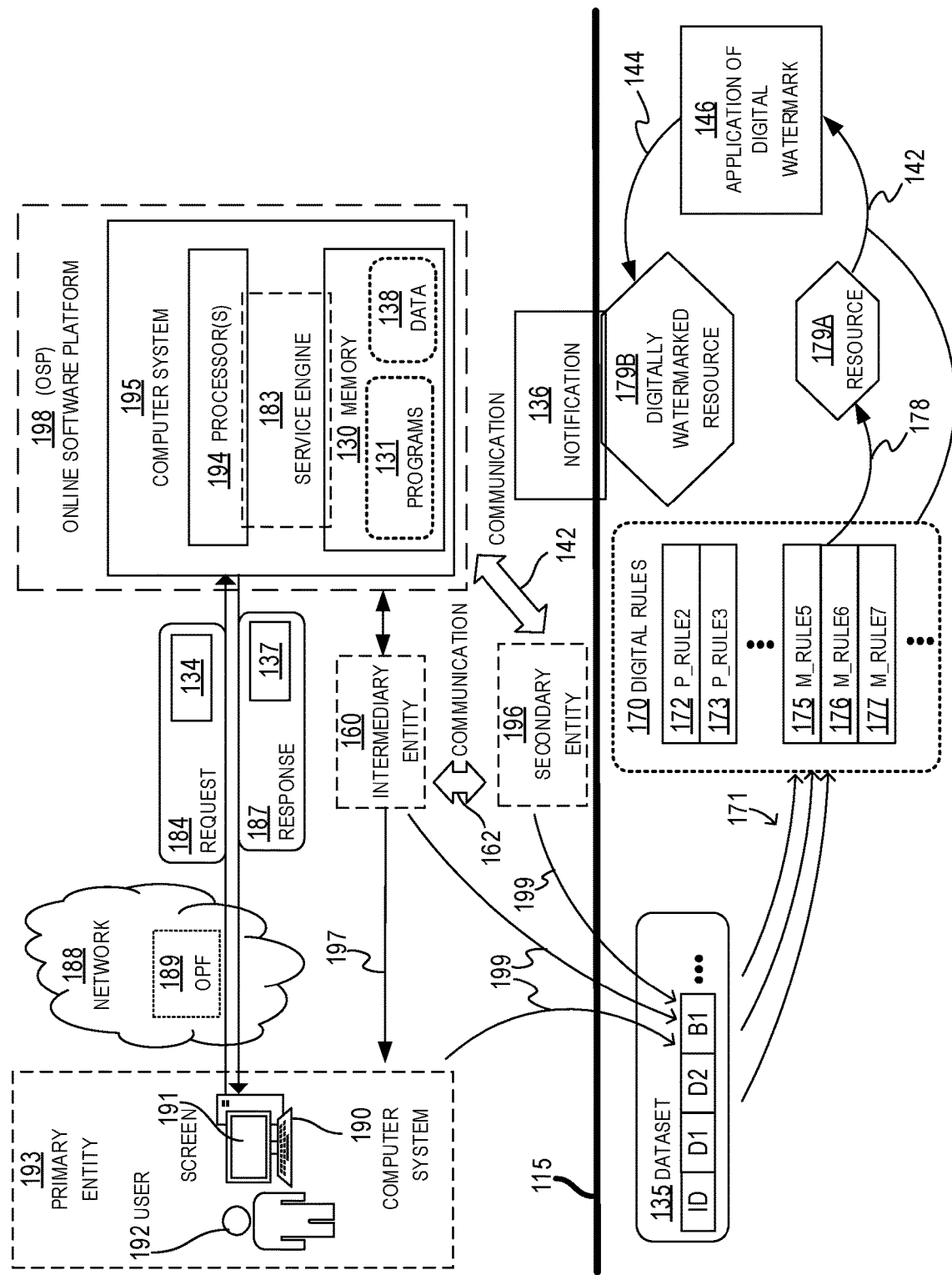
FIG. 1 is a diagram showing sample aspects of embodiments of the present disclosure that are improvements in automated computerized systems.

FIG. 1 is a diagram showing sample aspects of embodiments of the present disclosure. In particular, in an example embodiment, an OSP determines, via the service engine 183, a resource based on applying digital rules 170 to a dataset 135 of a client, such as primary entity 193. The OSP 198 may use data received via communication network 188 from a variety of sources, such as, for example, primary entity 193, secondary entity 196 and intermediary entity 160, and other entities and systems to produce a resource 179A. The resource 179A can be, or be a part of, a computational result, a document, an item of value, a representation of an item of value, etc., made, created or prepared for the user 192, the primary entity 193, the secondary entity 196, the intermediary entity 160, etc., on the basis of one or more attributes of dataset 135. As such, in some embodiments, the resource 179A is produced by a determination and/or a computation. The OSP 198 electronically performs application of a digital watermark 146 to the produced resource 179A and generates a digitally watermarked resource 179B, as indicated by arrow 144, such that the produced resource 179A is identifiable via the digital watermark as having been produced by the OSP 198. The OSP 198 may then electronically provide the digitally watermarked resource 179B via a notification 136 to the entity that requested it, such as primary entity 193. In other embodiments, the digital watermarked resource 179B may be electronically provided without relying on a notification. The digital watermarking of the produced resource 179A may be, for example, to enable determination of whether external data is an exact copy of some or all of the produced resource 179A, and thereby detect unauthorized use of the produced resource 179A and/or to determine incorrect or otherwise unauthorized attribution of external data to the OSP 198.

A thick line 115 separates this diagram, although not completely or rigorously, into a top portion and a bottom portion. Above the line 115 the emphasis is mostly on entities, components, their relationships, and their interactions, while below the emphasis is mostly processing of data that takes place often within one or more of the components above the line 115.

Above the line 115, a sample computer system 195 according to embodiments is shown. The computer system 195 has one or more processors 194 and a memory 130. The memory 130 stores programs 131 and data 138. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of an OSP 198. The OSP 198 can be configured to perform one or more predefined services, for example, via operations of the service engine 183. Such services can be searches, determinations, computations, verifications, notifications, the transmission of specialized information, including data that effectuates payments or remits resources, the generation and transmission of documents, the online accessing other systems to effect registrations, and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of primary entity 193, which can be referred to also merely as entity. In such instances, the user 192 can be an agent of the entity 193, and even within a physical site of the entity 193, although that is not necessary. In embodiments, the computer system 190 or other device of the user 192 or the entity 193 are client devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), a private or public wireless cellular network (e.g., a fifth generation (5G) wireless network) or the internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may then apply digital rules 170 to the payload 134 to determine a requested resource 179A, form a payload 137 that is an aspect of the resource 179A, and then push, send, or otherwise cause to be transmitted a response 187 that carries the payload 137 to the connector. The connector reads the response 187, and forwards the payload 137 to the certain application.

In an alternative such architecture, a device remote to the service engine 183, such as computer system 190, may have a particular application (not shown). In addition, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the primary entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 determines the requested resource 179A, and sends an aspect of it back to the REST API. In turn, the REST API sends the response 187 that has the payload 137 to the particular application.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In some instances, the user 192 or the primary entity 193 may have instances of relationships with secondary entities. Only one such secondary entity 196 is shown. However, additional secondary entities may be present in various other embodiments. In this example, the primary entity 193 has a relationship instance 197 with the secondary entity 196 via an intermediary entity 160 using communication 162 between the intermediary entity 160 and the secondary entity 196. For example, the communication 162 between the intermediary entity 160 and the secondary entity 196 may be made over network 188.

In some instances, the user 192, the primary entity 193 and/or the intermediary entity 160 may have data about one or more secondary entities, for example via relationship instances of the user 192 or primary entity with the secondary entity 196. Also, the intermediary entity 160 and/or secondary entity 196 may have data about the primary entity 193, for example via relationship instances of the user 192 or primary entity 193 with the intermediary entity 160 and/or secondary entity 196. The primary entity 193, the intermediary entity 160, and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In embodiments, the computer system 195 receives one or more datasets. A sample received dataset 135 is shown below the line 115. The dataset 135 may be received by the computer system 195 in a number of ways. In some embodiments, one or more requests may be received by the computer system 195 via a network. In this example, a request 184 is received by the computer system 195 via the network 188. The request 184 has been transmitted by the remote computer system 190. The received one or more requests can carry payloads. In this example, the request 184 carries a payload 134. In such embodiments, the one or more payloads may be parsed by the computer system 195 to extract the dataset. In this example, the payload 134 can be parsed by the computer system 195 to extract the dataset 135. In this example the single payload 134 encodes the entire dataset 135, but that is not required. In fact, a dataset can be received from the payloads of multiple requests. In such cases, a single payload may encode only a portion of the dataset. And, of course, the payload of a single request may encode multiple datasets. Additional computers may be involved with the network 188, some beyond the control of the user 192 or OSP 198, and some within such control.

The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196, and/or the intermediary entity 160 as indicated by arrows 199. (It should be noted that the arrows 199 describe a correspondence, but not the journey of data in becoming the received dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, an indication of whether the relationship instance 197 with the secondary entity 196 is via the intermediary entity 160, an indication of whether a resource associated with the relationship instance 197 is received via the intermediary entity 160, an indication of an identity or other characteristic of the intermediary entity 160, and so on. The dataset 135 may further have additional such values, as indicated by the horizontal dot-dot-dot to the right of the dataset 135. In some embodiments, each dataset, such as dataset 135 corresponds to one relationship instance. In some embodiments, the dataset 135 may correspond to a plurality of relationship instances and include such respective values for each respective relationship instance of the plurality of relationship instances. In some embodiments, the dataset 135 has values that characterize attributes of each of the primary entity 193, the secondary entity 196 and the intermediary entity 160, but that is not required. In some embodiments, the primary entity 193 may be the intermediary entity 160 or secondary entity 196 and communications described herein such as the request 184 and response 187 may be additionally or instead between the intermediary entity 160 or secondary entity 196 and the computer system 195.

In embodiments, stored digital rules 170 may be accessed by the computer system 195. These rules 170 are digital in that they are implemented for use by software. For example, these rules 170 may be implemented within programs 131 and data 138. The data portion of these rules 170 may alternately be implemented in memories in other places, which can be accessed via the network 188. These rules 170 may be accessed responsive to receiving a dataset, such as the dataset 135.

The digital rules 170 may include main rules, which can thus be accessed by the computer system 195. In this example, three sample digital main rules are shown explicitly, namely M_RULE5 175, M_RULE6 176, and M_RULE7 177. In this example, the digital rules 170 also include digital precedence rules P_RULE2 172 and P_RULE3 173, which can thus be further accessed by the computer system 195. The digital rules 170 may include additional rules and types of rules, as suggested by the vertical dot-dot-dots.

In embodiments, a certain one of the digital main rules may be identified from among the accessed stored rules by the computer system 195. In particular, values of the dataset 135 can be tested, according to arrows 171, against logical conditions of the digital main rules, as described later in this document. In this example, the certain main rule M_RULE6 176 is thus identified, which is indicated also by the beginning of an arrow 178 that is described in more detail later in this document. Identifying may be performed in a number of ways, and depending on how the digital main rules are implemented. An example is now described.

Figure 2:
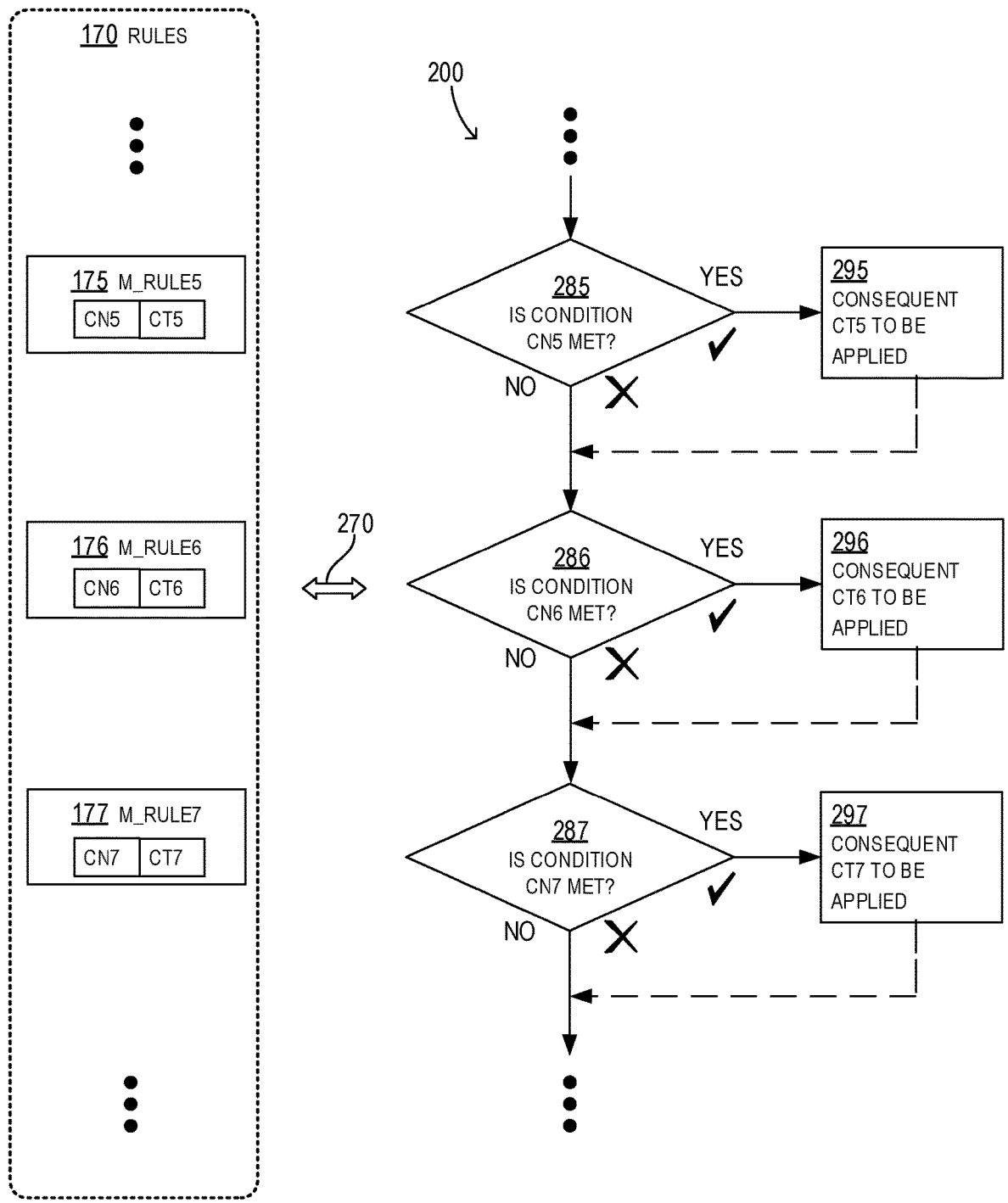
FIG. 2 is a diagram that repeats some of the digital main rules of FIG. 1 in more detail, and juxtaposes them with a flowchart portion for a sample method of how it may be recognized that conditions of a certain digital main rule can be met for its consequent to be applied, all according to embodiments of the present disclosure, and is an improvement in automated computerized systems.

Referring now also to FIG. 2, some of the digital main rules of digital rules 170 are repeated from FIG. 1 in more detail. In addition, according to an arrow 270, these digital main rules are shown juxtaposed with a flowchart portion 200. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. One or more of the digital rules 170 may have more than one conditions P that both must be met, and so on. And some of these digital rules 170 may be searched for, and grouped, according first to one of the conditions, and then the other. In this example, the digital main rules M_RULE5 175, M_RULE6 176, and M_RULE7 177 of FIG. 1, include respective conditions CN5, CN6, CN7, and respective consequents CT5, CT6, CT7 associated with the respective conditions CN5, CN6, CN7, respectively.

In embodiments, therefore, identifying is performed by recognizing, by the computer system 195, that a certain condition of a certain one of the accessed digital main rules is met by one or more of the values of the dataset. An example of the operations of recognizing that a condition is met and thus identifying an applicable rule is shown by flowchart portion 200 of FIG. 2. According to successive decision diamonds 285, 286, 287, it is determined whether or not conditions CN5, CN6, CN7 are met by at least one of the values of the dataset, respectively. If the answer is NO, then execution may proceed to the next diamond. If the answer is YES then, according to operations 295, 296, 297, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1, the certain M_RULE6 176 was thus identified. With reference to FIG. 2, the identification may have happened at operation 286 of the flowchart portion 200, at which time it was recognized that condition CN6 was met by a value of the dataset 135. This made: the condition CN6 be the certain condition, the digital main rule M_RULE6 176 be the certain digital main rule, and the consequent CT6 be the certain consequent of the certain digital main rule M_RULE6 176. And the certain consequent CT6 is associated with the certain condition CN6, since both are included by the certain digital main rule 176. Therefore, according to operation 296, consequent CT6 is what happens or becomes applied, as described below.

A number of examples are possible for how to recognize that a certain condition of a certain digital rule is met by at least one of the values of the dataset. Depending on the type of data, different rules may be applied. For instance, the certain condition could define a boundary of a region that is within a space. The region could be geometric, and be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

The above embodiments are only examples, and not limiting. For instance, the example of FIG. 2 suggests that there is a one-to-one correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 200. Or, as shown, it may be determined that more than one of the digital main rules is to be applied. In particular, operation 286 may give the answer YES such that consequent CT6 is to be applied, and operation 287 may also give the answer YES such that consequent CT7 is to be applied.

Where more than one of the digital main rules are found that could be applied, there are additional possibilities. For instance, the computer system 195 of FIG. 1 may further access at least one stored digital precedence rule, such as P_RULE2 172 or P_RULE3 173. Accordingly, the certain digital main rule may be thus identified also from the digital precedence rule. In particular, the digital precedence rule may decide which one or more of the digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search of the flowchart portion 200, so as to test the applicability of fewer than all the rules according to arrows 171.

Another example for how to recognize that a certain condition of a certain digital rule is met by at least one of the values of the dataset 135 is that the certain condition could be regarding whether a particular digital watermark from a plurality of digital watermarks is to be applied to a produced resource 179A. If such a condition is met, the digital rules 170 may indicate to apply a particular digital watermark to the produced resource 179A as indicated by arrow 142.

In embodiments, a resource may be produced for the dataset, by the computer system 195 applying the certain consequent of the certain digital main rule. The resource can be, or be a part of, a computational result, a document, an item of value, a representation of an item of value, etc., made, created or prepared for the user 192, the primary entity 193, the secondary entity 196, the intermediary entity 160, etc., on the basis of the attribute. As such, in some embodiments, the resource is produced by a determination and/or a computation. In the example of FIG. 1, the resource 179A is produced for the dataset 135, by the computer system 195 applying the certain M_RULE6 176, and in particular its certain consequent CT6, as indicated by the arrow 178. In fact, sometimes applying the consequent is more simply stated as "applying the rule".

The resource may be produced in a number of ways. For example, the certain consequent can be applied to one or more of the values of the dataset 135. For instance, one of the values of the dataset 135 can be a numerical base value, e.g. B1, that encodes an aspect of the dataset 135, as mentioned above. In such cases, applying the certain consequent may include performing a mathematical operation on the base value B1. For example, applying the certain consequent may include multiplying the base value B1 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

As mentioned above, in some embodiments two or more digital main rules may be applied. For instance, referring again to FIG. 1, the computer system 195 may recognize that an additional condition of an additional one of the accessed digital main rules 170 is met by at least one of the values of the dataset 135. In this example there would be no digital precedence rules, or the available digital precedence rules would not preclude both the certain digital main rule and the additional digital main rule from being applied concurrently. Such an additional digital main rule would have an additional consequent.

In such embodiments, the resource may be produced by the computer system applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B1 with a second number indicated by the additional consequent, so as to compute a second product. And, the resource may be produced by summing the first product and the second product.

In embodiments, a notification, such as notification 136, can be caused to be transmitted, e.g., via the network 188, by the computer system. A notification may be asynchronous, a flag, or an indication of information. For example, a notification may be an API call or part of one. In other embodiments, the notification may be a synchronous activity. The notification can include or can be about an aspect of the digitally watermarked resource 179B. In the example of FIG. 1, notification 136 can be caused to be transmitted by the computer system 195, for example as an answer or other response to the received dataset 135. In some embodiments, notification 136 can also or instead be caused to be transmitted by the computer system 195, for example as an answer or other response to data received by the computer system 195 from other external sources, alone or in combination with data from dataset 135. In particular, the notification 136 may inform about the aspect of the digitally watermarked resource 179B, namely that it has been determined, where it can be found, what it is, or at least a portion or a statistic of its content, a rounded version of it (which may also be digitally watermarked), and so on. Of course, the planning should be that the recipient of the notification 136 understands what it is being provided. In such instances a resource need not be produced for the notification 136 to be transmitted. Of course, the planning should be that the recipient of the notification 136 understands what it is being provided.

The notification 136 can be transmitted to one of an output device and another device. The output device may be the screen of a local user or a remote user. The notification 136 may thus cause a desired image, message, or other such notification to appear on the screen, such as within a Graphical User Interface (GUI) and so on. In some embodiments, the notification 136 may not be displayed on the screen, or the digitally watermarked aspects of the notification 136 may not be shown or may not be apparent in the notification 136. In some embodiments, the digital watermark on resource 179B is configured in a manner such that it is not easily recognizable, not easily detectable, or it is masked. The digital watermark may be accessed or revealed when, for example, data logs in a memory system are accessed. The other device can be the remote device, from which the dataset 135 was received, as in the example of FIG. 1. In particular, the computer system 195 may cause the notification 136 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example, the single payload 137 encodes the entire notification 136, but that is not required. Similarly with what is written above about encoding datasets in payloads, the notification 136 instead may be provided via two or more payloads, or in other cases the notification 136, and at least one other notification, may be included in the same single payload. Along with the digitally watermarked resource 179B, it can be advantageous to embed in the payload 137 the identity value (ID) and/or one or more values of the dataset 135. This will help the recipient correlate the response 187 to the request 184, and therefore match the received digitally watermarked resource 179B as the answer or other response to the appropriate dataset or request.

In an example embodiment, there may be a plurality of relationship instances between the primary entity 193 and one or more secondary entities, such as secondary entity 196. In some embodiments, such relationship instances are between the primary entity 193 and one or more secondary entities, such as secondary entity 196, via one or more intermediary entities, such as intermediary entity 160 using communication 162. Each relationship instance may be associated with one or more respective domains of a plurality of domains. Also, each relationship instance may be associated with one or more respective intermediary entities, such as intermediary entity 160, which handles or facilitates creation of the relationship instance using communication 162. For example, a resource associated with the relationship instance 197 may be received by the primary entity 193 via the intermediary entity 160. In various embodiments, a domain may be a region defined by a boundary as discussed above or may be an entity representing or otherwise associated with the region. For example, the region could be geographic, within the space of a city, a county, a state, a country, a continent or the earth. The plurality of relationship instances may result in a requirement that an electronic reporting document associated with the primary entity 193 be prepared regarding an amount of resources due to one or more of the plurality of domains, that the document be sent to one or more of the plurality of domains and that resources possibly be remitted to one or more of the plurality of domains. A domain as used herein may refer to a geographic area or to one or more authorities (or computerized systems controlled by such authorities) that set or define rules or digital rules for such a geographic area or domain as described herein. The OSP 198 may perform or facilitate such electronic actions.

For example, in one embodiment, primary entity 193 may have a relationship instance with secondary entity 196 and that particular relationship instance may be associated with one or more domains and with the particular intermediary entity 160 through which a resource associated with the relationship instance 197 was received by the primary entity 193 from the secondary entity 196. The association of the relationship instance with the one or more domains may be based on a variety of characteristics including, but not limited to: a relationship of one or more of the primary entity and secondary entity with the particular domain; a location of one or more of the primary entity and secondary entity within or associated with the particular domain; a region or location associated with one or more of the primary entity and secondary entity being within or associated with the particular domain; a previous relationship of one or more of the primary entity and secondary entity with the particular domain; a location of items associated with one or more of the primary entity and secondary entity within the particular domain; a number of relationships of one or more of the primary entity and secondary entity with the particular domain; a transfer of items associated with one or more of the primary entity and secondary entity to or from an entity within or associated with the particular domain; a transfer of data associated with one or more of the primary entity and secondary entity to or from an entity within or associated the particular domain, etc. The existence or identification of the relationship instance and/or one or more characteristics of the relationship instance may be defined or represented by values of dataset 135.

In some embodiments, for each relationship instance of the plurality of relationship instances, the OSP 198 electronically identifies a rate to calculate an amount of resource due to one or more respective domains associated with the relationship instance based on a source of a resource received for the relationship instance and the one or more respective domains. For example, the primary entity 193 may send request 184 to the computer system 195 of OSP 198 for services that facilitate remitting resources due to one or more respective domains. The request 184 may include the existence or identification of the relationship instance and/or one or more characteristics of the relationship instance as part of payload 134. The service engine 183 may then apply digital rules 170 to the relationship instance and/or one or more characteristics of the relationship instance to identify or otherwise determine the rate to calculate an amount of resource due to one or more respective domains associated with the relationship instance.

For example, digital precedence rule P_RULE2 172 may decide that rule M_RULE5 175 is to be applied when a particular condition is met. Digital precedence rule P_RULE2 172 may include a condition that indicates if a particular relationship instance is associated with a particular domain, then rule M_RULE5 175 is to be applied. The service engine 183 may determine that the condition is met due to one or more values of dataset 135 indicating the particular relationship instance and that the particular relationship instance is associated with the particular domain. Thus, as a consequent of precedence rule P_RULE2 172, the service engine 183 applies rule M_RULE5 175. Rule M_RULE5 175 may include a condition CN5 that indicates if a particular source of the resource received for that relationship instance is associated with that particular domain, then, as consequent CT5, a particular rate is to be used to calculate an amount of resource due to that particular domain.

Referring again to FIG. 2, at decision diamond 285 it is determined that the condition CN5 is met (i.e., that the particular source of the resource received for that relationship instance is associated with that particular domain) and thus, the particular rate is used to calculate an amount of resource due to that particular domain. Thus, by applying digital rules 170, the service engine 183 identifies the rate to calculate an amount of resource due to one or more respective domains associated with the relationship instance based on a source of a resource received for the relationship instance and the one or more respective domains, and also calculates an amount of resources due to at least one respective domain associated with the relationship instance based on the identified rate. In some embodiments, this calculated amount of resources due may be included by the service engine 183 as part of the resulting digitally watermarked resource 179B and/or notification 136. The service engine 183 may then form a payload 137 that includes the digitally watermarked resource 179B, and then push, send, or otherwise cause to be transmitted a response 187 that carries the payload 137 to a device remote to the service engine 183, such as computer system 190, a device of secondary entity 196 or another secondary entity. Digital rules 170 may include multiple different digital rules for each type of relationship instance and different domains. In various embodiments, the notification 136 may comprise the response 187, or the response 187 may be included in the notification 136.

Figure 3A:
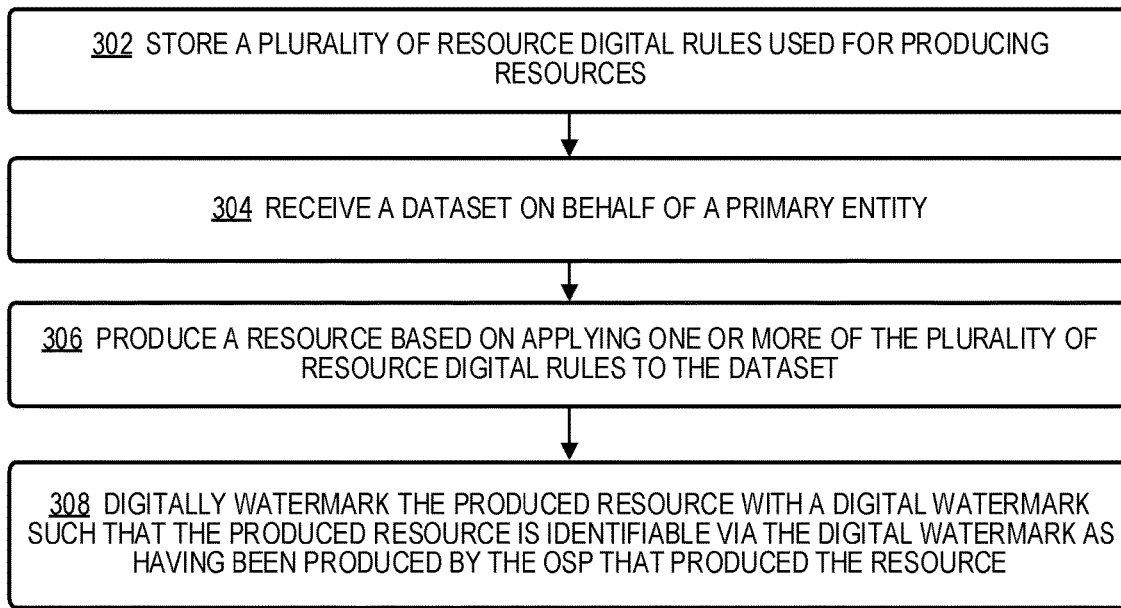
FIG. 3A is a flowchart illustrating a sample method for digitally watermarking resources produced by an OSP according to embodiments of the present disclosure that is an improvement in automated computerized systems.

FIG. 3A is a flowchart illustrating a sample method 300 for digitally watermarking resourced produced by an OSP according to embodiments of the present disclosure that is an improvement in automated computerized systems.

At 302, the OSP 198 electronically stores a plurality of resource digital rules used for producing resources for respective relationship instances of primary entities with other entities.

At 304, the OSP 198 electronically receives a dataset on behalf of a primary entity, in which the dataset includes data representing a relationship instance between the primary entity and a secondary entity.

At 306, the OSP 198, in response to the received dataset, produces a resource based on applying one or more of the plurality of resource digital rules to the dataset.

At 308, the OSP 198 digitally watermarks the produced resource with a digital watermark such that the produced resource is identifiable via the digital watermark as having been produced by the OSP 198.

Figure 3B:
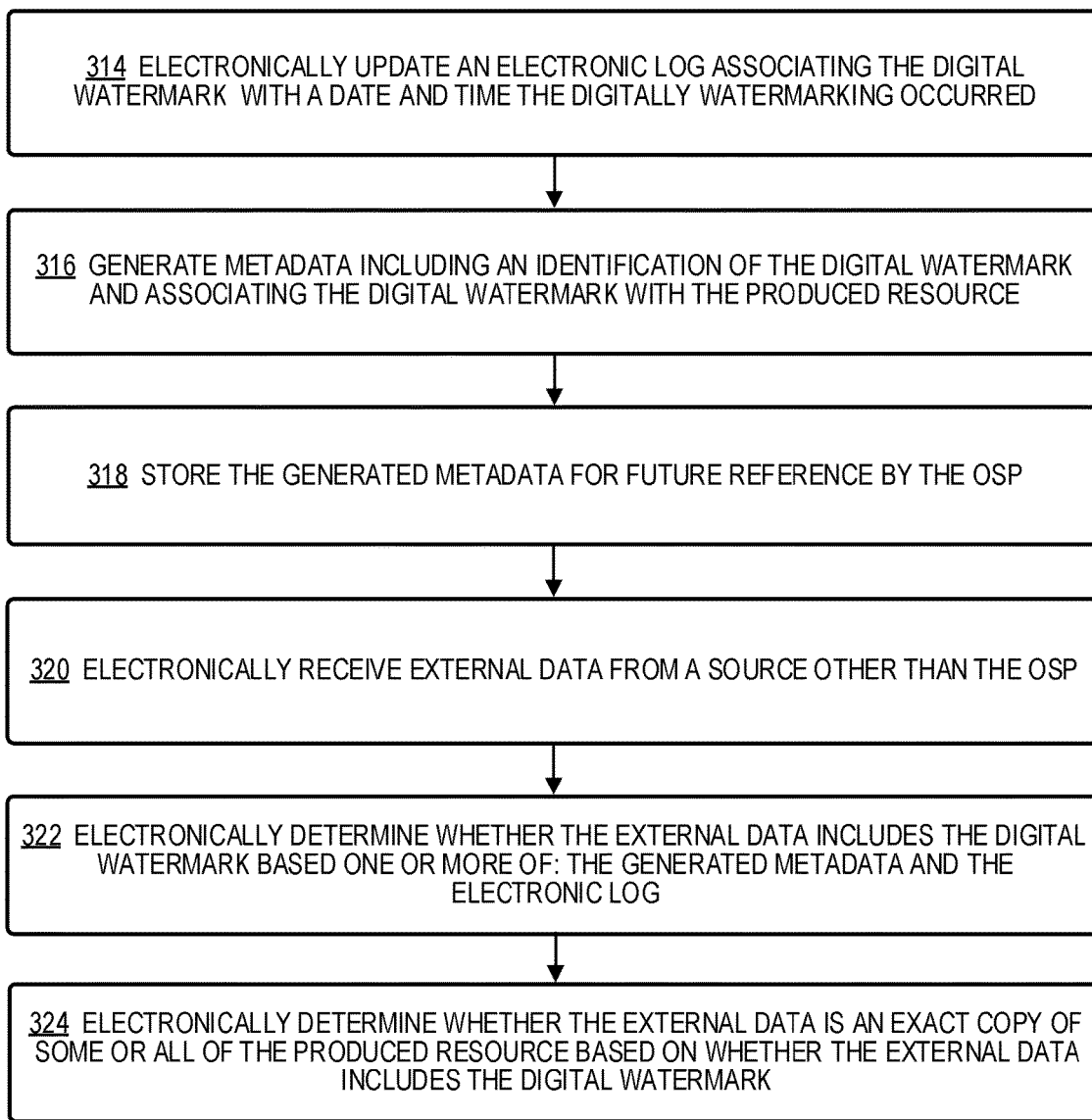
FIG. 3B is a flowchart illustrating a sample method for determining whether external data is an exact copy of a resource produced by the OSP based on digital watermarking according to embodiments of the present disclosure, and is an improvement in automated computerized systems.

FIG. 3B is a flowchart illustrating a sample method 303 for determining whether external data is an exact copy of a resource produced by the OSP based on digital watermarking according to embodiments of the present disclosure, and is an improvement in automated computerized systems.

At 314, the OSP 198 electronically updates an electronic log associating the digital watermark with a date and time the digitally watermarking occurred.

At 316, the OSP 198, electronically generates metadata including an identification of the digital watermark and associating the digital watermark with the produced resource.

At 318, the OSP 198 electronically stores the generated metadata for future reference by the OSP 198.

At 320 the OSP 198 electronically receives external data from a source other than the OSP 198.

At 322 the OSP 198 electronically determines whether the external data includes the digital watermark based on one or more of: the generated metadata and the electronic log. For example, the OSP 198 may electronically read the generated metadata to determine watermarks identified in the generated metadata. The OSP 198 then determines whether one or more watermarks identified in the generated metadata, including the digital watermark, is included in the external data.

As another example, the ODP 198 may determine a date and time indicating when the external data was originally generated (e.g., vis a timestamp or metadata accompanying the external data). The OSP 198 then electronically reads the electronic log associating the digital watermark with the date and time the digitally watermarking occurred. The OSP 198 may determine a match between the date and time indicating when the external data was originally generated and the date and time the digitally watermarking occurred. In response to determining the match between the date and time indicating when the external data was originally generated and the date and time the digitally watermarking occurred, the OSP 198 determines whether the external data includes the digital watermark. In some embodiments, the OSP 198 first attempts to determine whether the external data includes the digital watermark based on the generated metadata. If this is not possible (e.g., because the metadata is inaccessible or missing) then the OSP 198 attempts to determine whether the external data includes the digital watermark based on the electronic log.

At 324 the OSP 198 electronically determines whether the external data is an exact copy of some or all of the produced resource based on the determination whether the external data includes the digital watermark. In one embodiment, the OSP 198 electronically determines that the external data is an exact copy of some or all of the produced resource based on a determination that the external data includes the digital watermark, and then determines unauthorized use of the produced resource based on the determination that the external data is an exact copy of some or all of the produced resource.

In another example embodiment, the OSP 198 electronically determines that the external data is purported to be the produced resource of the OSP 198 and is attributed to the OSP. The OSP 198 then electronically determines that the external data is not an exact copy of the produced resource based on a determination that the external data does not include the digital watermark. The OSP 198 will then determine unauthorized attribution of the external data to the OSP based on the determination that the external data is not an exact copy of the produced resource of the OSP 198.

Figure 3C:
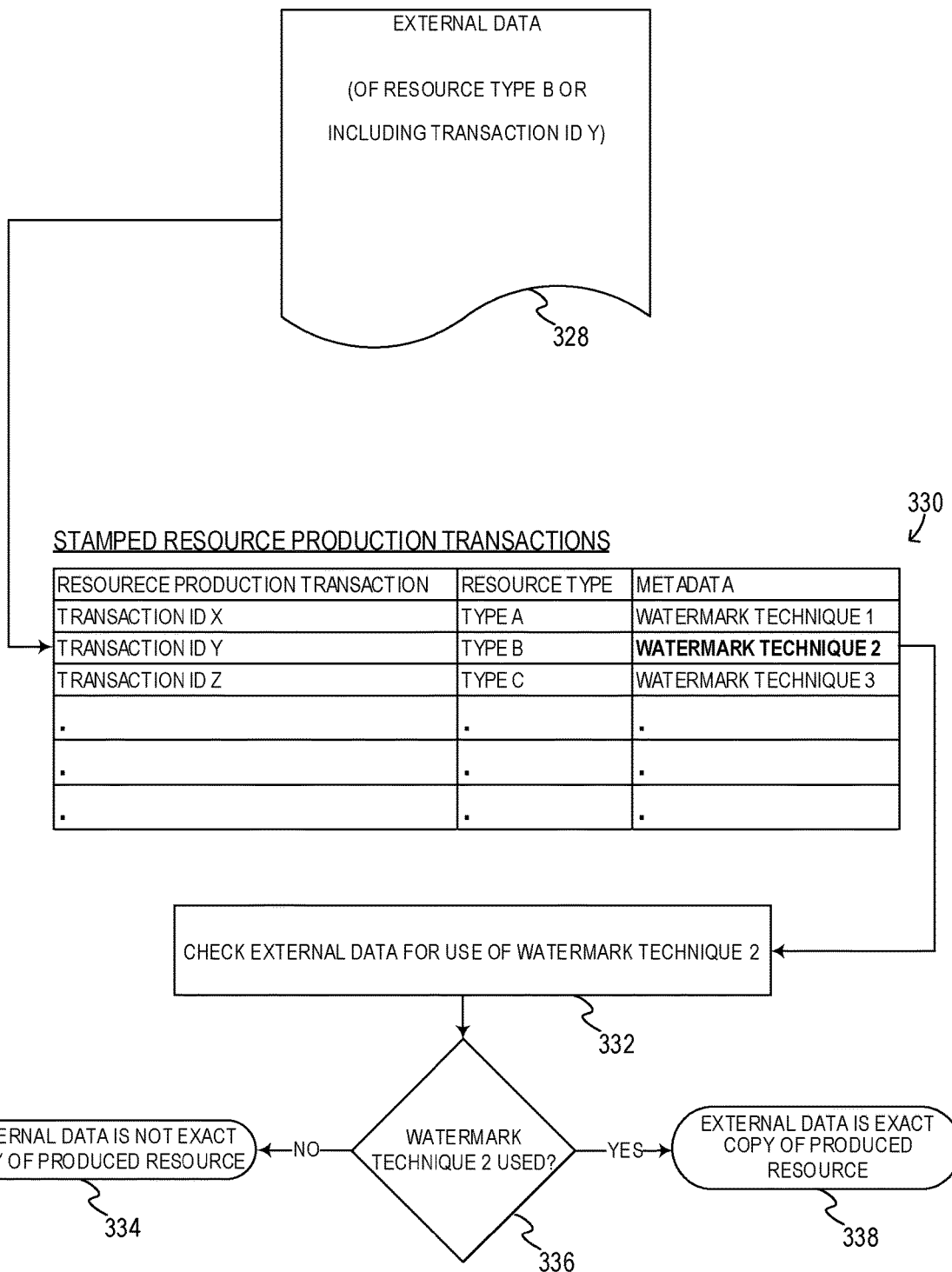
FIG. 3C is a data flow diagram illustrating an example of checking external data for use of a particular watermark technique used to watermark produced resources based on electronically stamped resource production transactions according to embodiments of the present disclosure, and is an improvement in automated computerized systems.

FIG. 3C is a data flow diagram illustrating an example of checking external data for use of a particular watermark technique used to watermark produced resources based on electronically stamped resource production transactions according to embodiments of the present disclosure, and is an improvement in automated computerized systems.

In the example shown, external data 328 (which may or may not have been produced by the OSP 198) is received by the OSP 198. The OSP 198 then proceeds to check whether the external 328 data includes a digital watermark applied by the OSP 198. Each time the OSP 198 produces a resource and provides the resource to an entity, the OSP 198 may electronically generate metadata regarding the produced resource by stamping the transaction including an identifier of the produced resource, the type of resource produced and the digital watermarking technique used to digitally watermark the produced resource. The generated metadata is illustrated as the stamped resource production transactions 330.

In the present example, the external data 328 may be identified as being of a particular type of resource (e.g., resource type "B") and includes a transaction ID of "Y". The OSP 198 automatically finds in the stamped resource production transactions 330 that watermark technique 2 was used to watermark the produced resource having transaction ID Y with resource type B. In various embodiments, the applicable watermark technique to use to check the external data may be identified in the metadata including the stamped resource production transactions 330 by one or both of the transaction ID and the resource type associated with the external data 328.

The OSP 198 then electronically checks 332 the external data to see whether a digital watermark resulting from using watermark technique 2 appears in the data of external data 328. For example, this may be performed by electronically searching in external data 328 for particular data, or changes associated with particular data, that would have resulted from using watermark technique 2 were it used to digitally watermark external data 328. In some instances, such changes may be so slight, or are changes to binary or machine readable code, such that they require a computer to detect them. In some embodiments, the digital watermark is a pattern only known to the watermark creator, and such watermark would not likely happen naturally. In some embodiments the digital watermark is created with an algorithm using keys, pattern, or marking only known to the creator. Based on the checking 332 of the external data 328, the OSP 198 makes a determination 336 whether digital watermark technique 2 was used to watermark external data 328. If it is determined by the OSP 198 that digital watermark technique 2 was used to watermark external data 328, then the OSP 198 determines 338 that the external data 328 is an exact copy of the resource produced by OSP 198. If it is determined by the OSP 198 that digital watermark technique 2 was not used to watermark external data 328, then the OSP 198 determines 334 that the external data 328 is not an exact copy of the resource produced by OSP 198 (or it may just be determined that the digital watermark was removed). In some embodiments, before making a final determination, the OSP 198 may automatically check the external data 328 to see whether a digital watermark resulting from using other possible digital watermark techniques used by the OSP 198 appears in external data 328.

Figure 3D:
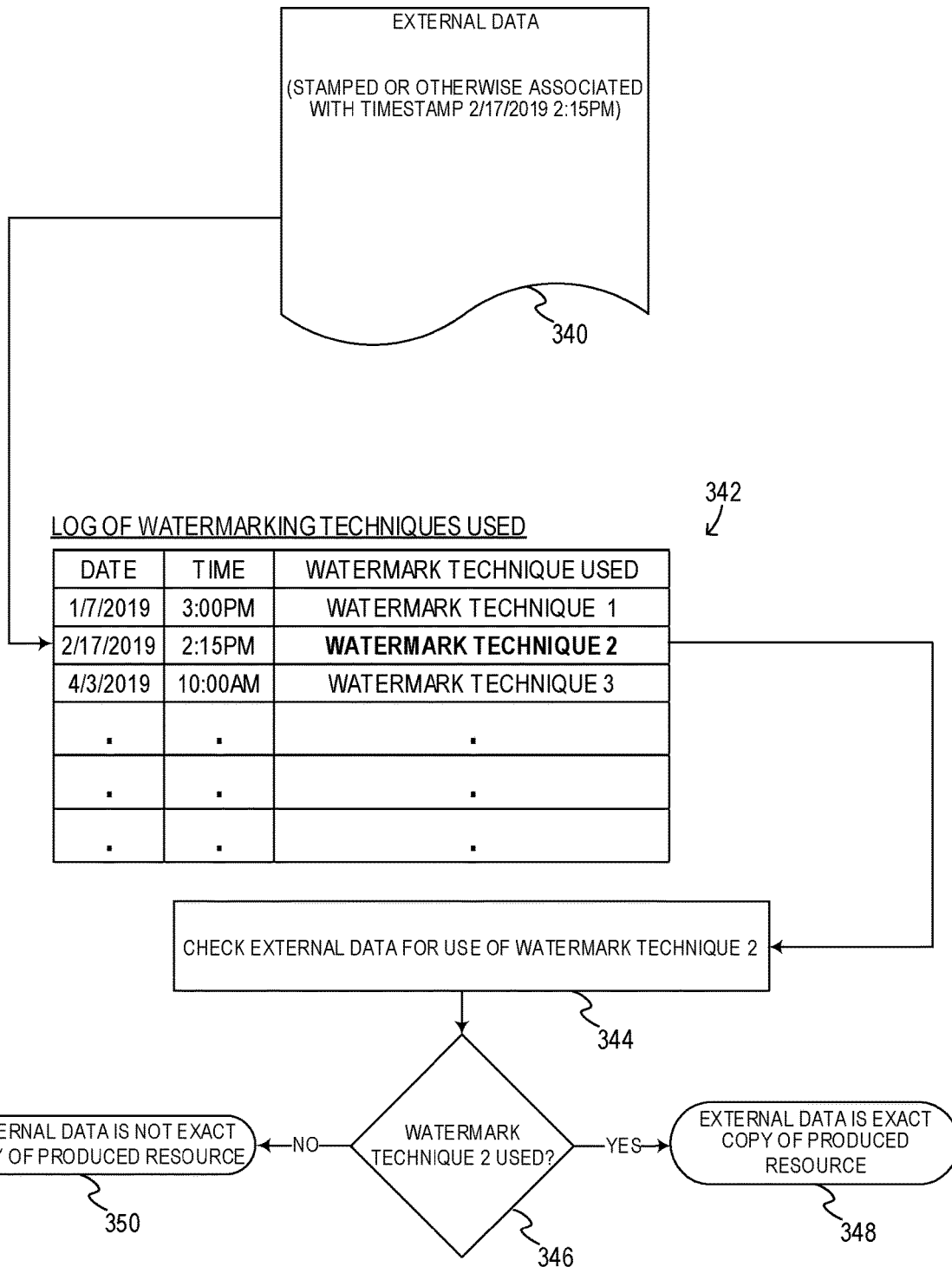
FIG. 3D is a data flow diagram illustrating an example of checking external data for use of a particular watermark technique based on an electronic log of watermarking techniques used to watermark produced resources according to embodiments of the present disclosure, and is an improvement in automated computerized systems.

FIG. 3D is a data flow diagram illustrating an example of checking external data for use of a particular watermark technique based on an electronic log of watermarking techniques used to watermark produced resources according to embodiments of the present disclosure, and is an improvement in automated computerized systems.

In the example shown, external data 340 (which may or may not have been produced by the OSP 198) is received by the OSP 198. The OSP 198 then proceeds to check whether the external data 340 includes a digital watermark applied by the OSP 198. The OSP 198 may electronically keep a log of watermark techniques used 342 that indicates particular watermark techniques that were used by the OSP 198 and the particular date and time at which each was used. The OSP 198 may increase security by using different watermark techniques at different times.

The external data 340 may have a timestamp or otherwise be associated with a particular date and time. For example, the OSP 198 may determine by reading timestamps, dates or analysis of the data characteristics in external data 340 that the particular data in the OSP 198, or data of or that type, was produced by the OSP 198 on a particular date and/or at a particular time. In the present example, the external data has a timestamp of "2/17/2019 2:15 PM" indicating a purported original production date and time of the resource included in the external data 340. In the example shown, the OSP 198 automatically finds in log 342 that watermark technique 2 is the watermark technique that was being used on 2/17/2019 at 2:15 PM by the OSP 198 to produce the resource.

The OSP 198 then electronically checks 244 the external data to see whether a digital watermark resulting from using watermark technique 2 appears in the data of external data 340. For example, this may be performed by electronically searching in external data 340 for particular data, or changes associated with particular data, that would have resulted from using watermark technique 2 were it used to digitally watermark external data 340. In some instances, such changes may be so slight, or are changes to binary or machine readable code, such that they require a computer to detect them. Based on the checking 344 of the external data 340, the OSP 198 makes a determination 346 whether digital watermark technique 2 was used to digitally watermark external data 328. If it is determined by the OSP 198 that digital watermark technique 2 was used to watermark external data 340, then the OSP 198 determines 348 that the external data 328 is an exact copy of the resource produced by OSP 198. If it is determined by the OSP 198 that digital watermark technique 2 was not used to watermark external data 340, then the OSP 198 determines 350 that the external data 340 is not an exact copy of the resource produced by OSP 198 (or it may instead be determined that the digital watermark was removed). In some embodiments, before making a final determination, the OSP 198 may automatically check the external data 340 to see whether a digital watermark resulting from using other possible digital watermark techniques used by the OSP 198 appears in external data 340.

Figure 4:
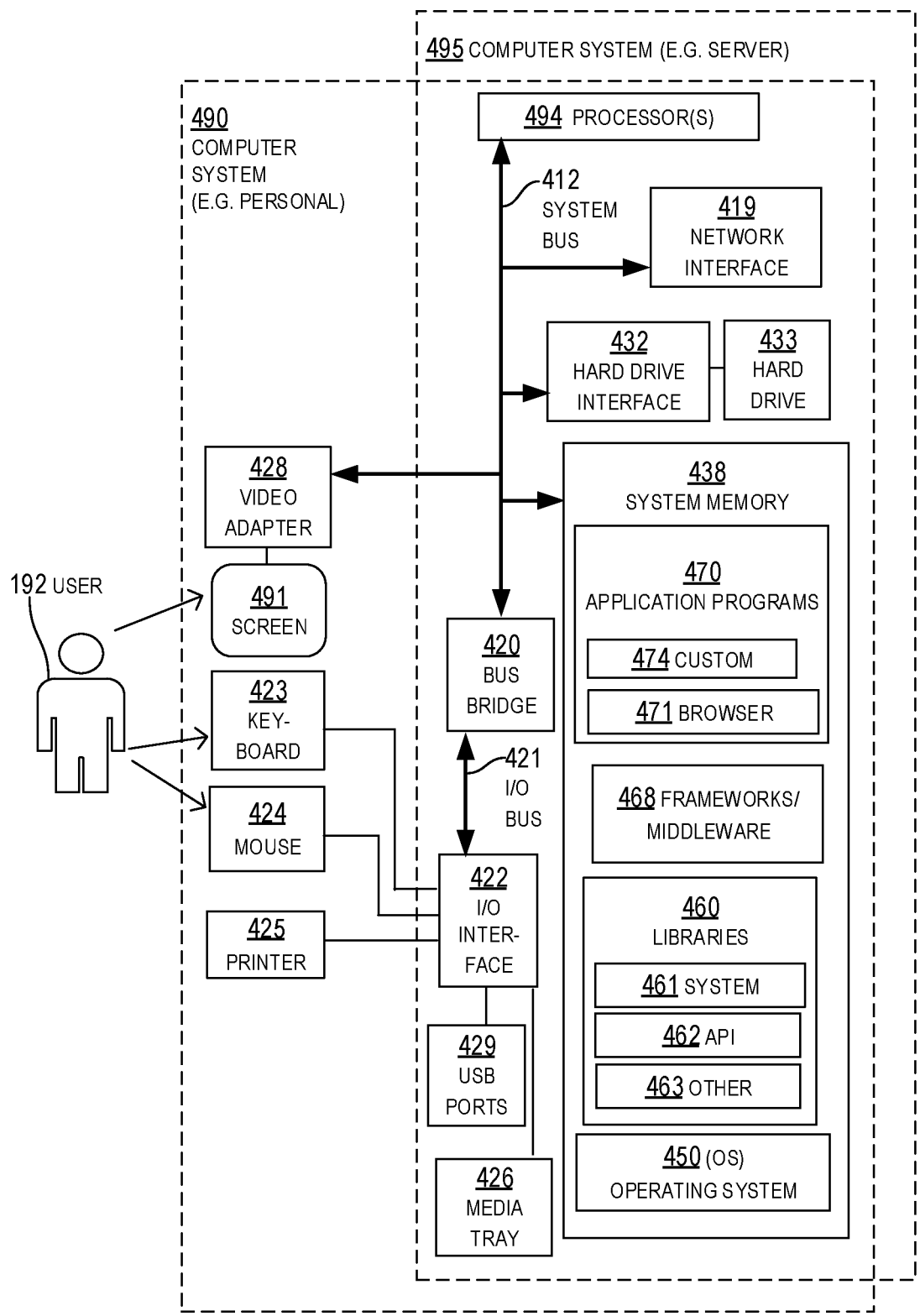
FIG. 4 is a block diagram showing additional components of sample computer systems according to embodiments of the present disclosure, and is an improvement in automated computerized systems.

FIG. 4 is a block diagram showing additional components of sample computer systems according to embodiments of the present disclosure. FIG. 4 shows details for a sample computer system 495 and for a sample computer system 490. The computer system 495 may be a server, while the computer system 490 may be a personal device, such as a personal computer, a desktop computer, a personal computing device such as a laptop computer, a tablet computer, a mobile phone, and so on. Either type may be used for the computer system 195 or 190 of FIG. 1, a computer system that is part of OPF 189 and/or a computer system that is part of any entity or system shown in any of the Figures of the present disclosure.

The computer system 495 and the computer system 490 have similarities, which FIG. 4 exploits for purposes of economy in this document. It will be understood, however, that a component in the computer system 495 may be implemented differently than the same component in the computer system 490. For instance, a memory in a server may be larger than a memory in a personal computer, and so on. Similarly, custom application programs 474 that implement embodiments may be different, and so on.

The computer system 495 includes one or more processors 494. The processor(s) 494 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 494 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific specialized machines, or specific specialized components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 495, or the computer system 490, are not intended to be exhaustive. Rather, they are representative, for highlighting essential components that can be used with embodiments.

The computer system 495 also includes a system bus 412 that is coupled to the processor(s) 494. The system bus 412 can be used by the processor(s) 494 to control and/or communicate with other components of the computer system 495.

The computer system 495 additionally includes a network interface 419 that is coupled to system bus 412. Network interface 419 can be used to access a communications network, such as the network 188. Network interface 419 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 495 also includes various memory components. These memory components include memory components shown separately in the computer system 495, plus cache memory within the processor(s) 494. Accordingly, these memory components are examples of non-transitory machine-readable media. The memory components shown separately in the computer system 495 are variously coupled, directly or indirectly, with the processor(s) 494. The coupling in this example is via the system bus 412.

Instructions for performing any of the methods or functions described in this document may be stored, completely or partially, within the memory components of the computer system 495, etc. Therefore, one or more of these non-transitory computer-readable media can be configured to store instructions which, when executed by one or more processors 494 of a host computer system such as the computer system 495 or the computer system 490, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 495 include a non-volatile hard drive 433. The computer system 495 further includes a hard drive interface 432 that is coupled to the hard drive 433 and to the system bus 412.

The memory components of the computer system 495 include a system memory 438. The system memory 438 includes volatile memory including, but not limited to, cache memory, registers and buffers. In embodiments, data from the hard drive 433 populates registers of the volatile memory of the system memory 438.

In some embodiments, the system memory 438 has a software architecture that uses a stack of layers, with each layer providing a particular functionality. In this example the layers include, starting from the bottom, an Operating System (OS) 450, libraries 460, frameworks/middleware 468 and application programs 470, which are also known as applications 470. Other software architectures may include less, more or different layers. For example, a presentation layer may also be included. For another example, some mobile or special purpose operating systems may not provide a frameworks/middleware 468.

The OS 450 may manage hardware resources and provide common services. The libraries 460 provide a common infrastructure that is used by the applications 470 and/or other components and/or layers. The libraries 460 provide functionality that allows other software components to perform tasks more easily than if they interfaced directly with the specific underlying functionality of the OS 450. The libraries 460 may include system libraries 461, such as a C standard library. The system libraries 461 may provide functions such as memory allocation functions, string manipulation functions, mathematical functions, and the like.

In addition, the libraries 460 may include API libraries 462 and other libraries 463. The API libraries 462 may include media libraries, such as libraries to support presentation and manipulation of various media formats such as MPEG4, H.264, MP3, AAC, AMR, JPG, and PNG. The API libraries 462 may also include graphics libraries, for instance an OpenGL framework that may be used to render 2D and 3D in a graphic content on the screen 491. The API libraries 462 may further include database libraries, for instance SQLite, which may support various relational database functions. The API libraries 462 may additionally include web libraries, for instance WebKit, which may support web browsing functionality, and also libraries for applications 470.

The frameworks/middleware 468 may provide a higher-level common infrastructure that may be used by the applications 470 and/or other software components/modules. For example, the frameworks/middleware 468 may provide various Graphic User Interface (GUI) functions, high-level resource management, high-level location services, and so forth. The frameworks/middleware 468 may provide a broad spectrum of other APIs that may be used by the applications 470 and/or other software components/modules, some of which may be specific to the OS 450 or to a platform.

The application programs 470 are also known more simply as applications and apps. One such app is a browser 2771, which is a software that can permit the user 192 to access other devices in the internet, for example while using a Graphic User Interface (GUI). The browser 2771 includes program modules and instructions that enable the computer system 495 to exchange network messages with a network, for example using Hypertext Transfer Protocol (HTTP) messaging.

The application programs 470 may include one or more custom applications 474, made according to embodiments. These can be made so as to cause their host computer to perform operations according to embodiments disclosed herein. Of course, when implemented by software, operations according to embodiments disclosed herein may be implemented much faster than may be implemented by a human mind if they can be implemented in the human mind at all; for example, tens or hundreds or millions of such operations may be performed per second according to embodiments, which is much faster than a human mind can do. Such speed of operations, and thus the use of such computing systems and networks, are integral to the embodiments described herein because such operations would be practically useless unless they are able to be applied to hundreds or thousands of computer network clients simultaneously or concurrently across computer networks and to the vast volumes of data that change in real-time provided by such computer network clients. Implementing a practical application of the embodiments described herein to hundreds or thousands of computer network clients simultaneously or concurrently across computer networks on which they operate and to the vast volumes of data that change in real-time provided by such computer network clients is impossible to do in the human mind.

Other such applications 470 may include a contacts application, a word processing application, a location application, a media application, a messaging application, and so on. Applications 470 may be developed using the ANDROID™ or IOS™ Software Development Kit (SDK) by an entity other than the vendor of the particular platform, and may be mobile software running on a mobile operating system such as IOS™, ANDROID™, Win phones, or other mobile operating and/or portable computing systems. The applications 470 may use built-in functions of the OS 450, of the libraries 460, and of the frameworks/middleware 468 to create user interfaces for the user 192 to interact with.

The computer system 495 moreover includes a bus bridge 420 coupled to the system bus 412. The computer system 495 furthermore includes an input/output (I/O) bus 421 coupled to the bus bridge 420. The computer system 495 also includes an I/O interface 422 coupled to the I/O bus 421.

For being accessed, the computer system 495 also includes one or more Universal Serial Bus (USB) ports 429. These can be coupled to the I/O interface 422. The computer system 495 further includes a media tray 426, which may include storage devices such as CD-ROM drives, multimedia interfaces, and so on.

The computer system 490 may include many components similar to those of the computer system 495, as seen in FIG. 4. In addition, a number of the application programs may be more suitable for the computer system 490 than for the computer system 495.

The computer system 490 further includes peripheral input/output (I/O) devices for being accessed by a user more routinely. As such, the computer system 490 includes a screen 491 and a video adapter 428 to drive and/or support the screen 491. The video adapter 428 is coupled to the system bus 412.

The computer system 490 also includes a keyboard 423, a mouse 424, and a printer 425. In this example, the keyboard 423, the mouse 424, and the printer 425 are directly coupled to the I/O interface 422. Sometimes this coupling is wireless or may be via the USB ports 429.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 494.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. (Some, but not all, of these aspects have even similar reference numerals.)

Figure 5:
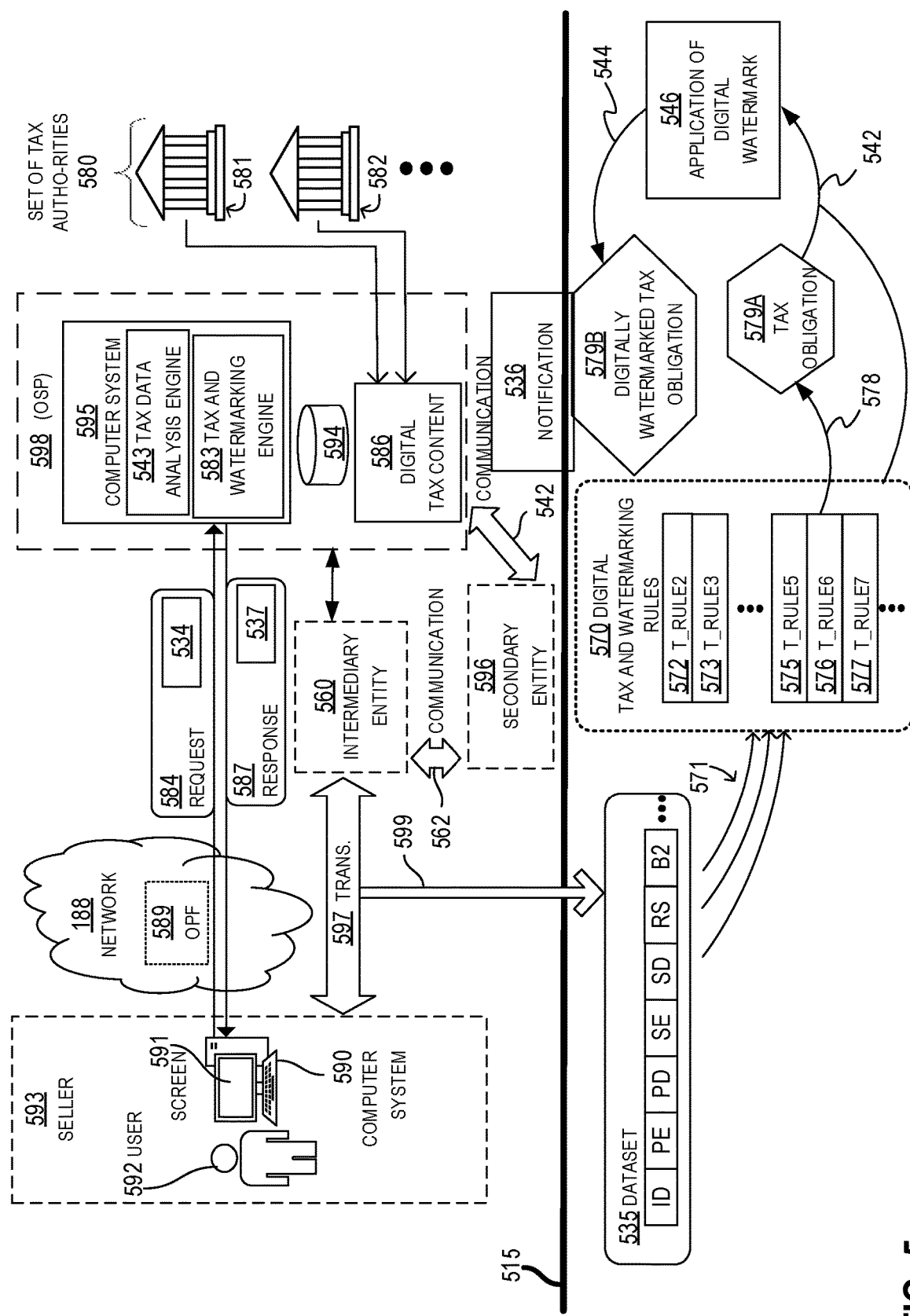
FIG. 5 is a diagram of sample aspects for describing operational examples and use cases of embodiments of the present disclosure that are improvements in automated computerized systems.

FIG. 5 is a diagram of sample aspects for describing operational examples and use cases of embodiments of the present disclosure that are improvements in automated computerized systems. As an example use case, the primary entity 193 of FIG. 1 may be a seller 593 of goods or services who uses the electronic services of the OSP 598 to calculate a tax obligation, such as sales tax, on transactions of the seller in real-time as the transactions occur as well for preparation and sending of an associated tax return document for the transaction 597. In the process of the OSP 598 providing such services, the OSP 598 digitally watermarks its outputs (e.g., the computed tax obligation 579A). This way, the OSP 598 can recognize whether someone else is using its data, perhaps without authorization, and/or whether someone falsely presents non-OSP data as OSP data (false attribution). In one example embodiment, the OSP 598 leaves a digital breadcrumb trail for itself documenting in a log (such as in database 594) all of the watermarking techniques that were enabled by the tax and watermarking engine 583 on a particular day and time. Further, each transaction in which data is produced by the OSP 598 for an entity such as seller 593, the transaction may be stamped with this information in its metadata (accessible only by the OSP 598) such that the OSP 598 can read the list of watermarks in the metadata and then test them in the external data itself to ensure they are valid. If the OSP 598 should lose the metadata, the OSP 598 may go to the electronic log in database 594 and infer what likely was added to the document in terms of intentional distortions made in the watermarking process.

For example, the OSP 598 could alter a document (e.g., an invoice) by touching it in extremely subtle but identifiable ways to create a digital watermark. Many of such watermarks are generated such that they are highly likely to survive subsequent copying through downstream customer systems. This takes advantage of the fact that modern computation systems are able to deal with data at a level of accuracy and specificity in data handling which is often invisible or redacted for human consumption. Using a variety of techniques such as described herein, alone or in combination, the OSP 198 uniquely imprints its signature or other mark on any document (like an invoice, or other data the OSP 598 provides or furnishes) in nearly invisible ways that are likely to survive subsequent processing, and thus increases the usefulness, accuracy and speed of digital watermarking and subsequent automated detection. Later, upon being confronted with external data, the OSP 598 may authenticate the external data as originating from the OSP 598, or being an exact copy of data originating from the OSP 598, by electronically checking the external data for the digital watermark. Thus, the systems and methods described herein for automated actions for digitally watermarking resources produced by an OSP improves the functioning of computer or other hardware, such as by reducing the processing, storage, and/or data transmission resources needed to perform various tasks, thereby enabling the tasks to be performed by less capable, capacious, and/or expensive hardware devices, and/or be performed with less latency, and/or preserving more of the conserved resources for use in performing other tasks or additional instances of the same task.

Operational examples and sample use cases are possible where the attribute of an entity in a dataset is any one of: the entity's name; type of entity; a physical location such as an address; a contact information element; transactions of the entity; an identifier of a specific source of revenue received for a transaction of the entity; characteristics of transactions of the entity; licensure and/or or registration of the entity and/or products or services the entity produces, sells, stores and/or transfers; products or services produced, sold, stored and/or transferred by the entity; types of products or services produced, sold, stored and/or transferred by the entity; a location to which products are sent, shipped or transferred; a location from which products are received; a location of a property owned by the entity; a location of a property owned by the entity within a particular region of other domain; an affiliation; a characterization of another entity; a characterization by another entity; an association or relationship with another entity (general or specific instances); an asset of the entity; a declaration by or on behalf of the entity; and so on. Different resources may be produced in such instances, and so on.

FIG. 5 is diagram for an operational example and use case where the resource 579A includes a tax obligation of a seller 593, an intermediary entity 560 and/or a secondary entity 596, due to a transaction 597. The resource 579A may also include the preparation and sending of an associated tax return document for the transaction 597. In the present example, the transaction 597 may be made via an intermediary entity 560 that handles the transaction 597 between the seller 593 and the secondary entity 596 via communication 562 by the intermediary entity 560 with the secondary entity 596. The transaction 597 may include some or all of the data comprising the communication 562 between the intermediary entity 560 and the secondary entity 596. For example, values that characterize attributes of the transaction 597 may be extracted from the communication 562 such as price, fees and/or or rate for the transaction; taxes for the transaction; address or location of the transaction; identification of the seller 593, secondary entity 596 and/or intermediary entity 560; a contract or agreement between the seller and another entity; a contract or agreement regarding collection or remitting of taxes for the transaction; other terms of the transaction; etc. In some embodiments, the communication 562 may be made via network 188. In some instances, some or all of the data comprising the communication 562 may be sent directly to the OSP 598 from the intermediary entity as part of dataset 535. In such embodiments, the transaction 597 would be directly between the seller 593 and the secondary entity 596 instead of being made via the intermediary entity 560 using communication 562 as shown in FIG. 5.

It will be recognized that aspects of FIG. 5 have similarities with aspects of FIG. 1. Portions of such aspects may be implemented as described for analogous aspects of FIG. 1. In particular, a thick line 515 separates FIG. 5, although not completely or rigorously, into a top portion and a bottom portion. Above the line 515 the emphasis is mostly on entities, components, their relationships, and their interactions, while below it the emphasis is mostly processing of data that takes place often within one or more of the components above the line 515.

Above the line 515, a computer system 595 is shown, which is used to help customers, such as a user 592, with tax compliance. Further in this example, the computer system 595 is part of an OSP 598 that is implemented as a Software as a Service (SaaS) provider, for being accessed by the user 592 online. Alternately, the functionality of the computer system 595 may be provided locally to a user.

The user 592 may be standalone. The user 592 may use a computer system 590 that has a screen 591. In embodiments, the user 592 and the computer system 590 are considered part of the seller 593, which is also known as seller 593. The seller 593 can be a business, such as a seller of items, a reseller, a buyer, and so on. In such instances, the user 592 can be an employee, a contractor, or otherwise an agent of the seller 593. In use cases, the secondary entity 596 is a buyer and together they are performing the buy-sell transaction 597. The buy-sell transaction 597 may involve an operation, such as an exchange of data to form an agreement. This operation can be performed in person, or over the network 188, etc. In such cases the seller 593 can even be an online seller, but that is not necessary. The transaction 597 will have data that is known to the seller 593, similarly with what was described by the relationship instance 197 of FIG. 1. In the present example, the transactions 597 may be made via an intermediary entity 560.

In a number of instances, the user 592, the secondary seller 593 and/or the intermediary entity 560 use software applications to manage their business activities, such as sales, resource management, production, inventory management, delivery, billing, and so on. The user 592, the seller 593 and/or the intermediary entity 560 may further use accounting applications to manage purchase orders, reservations, bookings, sales invoices, refunds, payroll, accounts payable, accounts receivable, and so on. Such software applications, and more, may be used locally by the user 592 or intermediary entity 560, or from an Online Processing Facility (OPF) 589 that has been engaged for this purpose by the user 592, the seller 593 and/or intermediary entity 560. In such use cases, the OPF 589 can be a Mobile Payments system, a Point Of Sale (POS) system, an Accounting application, an Enterprise Resource Planning (ERP) system or provider, an e-commerce provider, an electronic marketplace, a Customer Relationship Management (CRM) system, and so on. In some embodiments, the OPF may be, or be used by, the intermediary entity 560.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a country, of a state, of a municipality, of a local district such as a local transit district and so on. So, for example, when a business sells items in transactions that can be taxed by a tax authority, the business may have the tax obligations to the tax authority. These obligations include requiring the business to: a) register itself with the tax authority's tax agency, b) set up internal processes for collecting sales tax in accordance with the sales tax rules of the tax authority, c) maintain records of the sales transactions and of the collected sales tax in the event of a subsequent audit by the taxi agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A technical challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

Even where a seller might not have reached any of the thresholds for economic nexus, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state. The situation becomes even more complex when a seller sells directly to a state, and also via such an intermediary.

To help with such complex determinations and solve such technical problems, the computer system 595 may be specialized device for tax compliance as disclosed herein. The computer system 595 may have one or more processors and memory, for example, as was described for the computer system 195 of FIG. 1. The computer system 595 thus implements a tax and watermarking engine 583 to make the determinations of tax obligations, perform digital watermarking and perform preparation and sending of associated tax return document(s). The tax and watermarking engine 583 can be as described for the service engine 183.

The computer system 595 may further store locally entity data, such as seller data 545, i.e., data of user 592, of seller 593 and/or intermediary entity 560, any of which/whom may be a customer, and/or a seller or a buyer in a sales transaction in various embodiments. The entity data may include profile data of the customer and transaction data from which a determination of a tax obligation is desired. In the online implementation of FIG. 5, the OSP 598 has a database 594 for storing the entity data, including seller data 545. This entity data may be inputted by the user 592, and/or caused to be downloaded or uploaded by the user 592 from the computer system 590, from the intermediary entity 560 or from the OPF 589, or extracted from the computer system 590 or from the intermediary entity 560 or from the OPF 589, and so on. In other implementations, a simpler memory configuration may suffice for storing the entity data.

A digital tax content 586 is further implemented within the OSP 598. The digital tax content 586 can be a utility that stores digital tax and watermarking rules 570 for use by the tax and watermarking engine 583. As part of managing the digital tax content 586, there may be continuous updates of the digital tax rules, by inputs gleaned from a set 580 of different tax authorities 581, 582, and so on. Updating may be performed by humans, or by computers, and so on. As mentioned above, the number of the different tax authorities in the set 580 may be very large.

For a specific determination of a tax obligation, the computer system 595 may receive one or more datasets. A sample received dataset 535 is shown just below line 515, which can be similar to what was described for the dataset 135 of FIG. 1. In this example, the computer system 590 transmits a request 584 that includes a payload 534, and the dataset 535 is received by the computer system 595 parsing the received payload 534. In this example the single payload 534 encodes the entire dataset 535, but that is not required, as mentioned earlier.

In this example, the dataset 535 has been received because it is desired to determine any tax obligations arising from the buy-sell transaction 597. As such, the sample received dataset 535 has values that characterize attributes of the buy-sell transaction 597, as indicated by an arrow 599. (It should be noted that the arrow 599 describes a correspondence, but not the journey of the data of the buy-sell transaction 597 in becoming the received dataset 535.) Accordingly, in this example the sample received dataset 535 has a value ID for an identity of the dataset 535 and/or the transaction 597. The dataset 535 also has a value PE for the name of the seller 593 or the user 592, which can be the seller making sales transactions, some online. The dataset 535 further has a value PD for relevant data of the seller 593 or the user 592, such as an address, place(s) of business, prior nexus determinations with various tax jurisdictions, and so on. The dataset 535 also has a value SE for the name of the secondary entity 596, which can be the buyer. The dataset 535 further has a value SD for relevant data of the secondary entity 596, entity-driven exemption status, and so on. The dataset 535 has a value B2 for the sale price of the item sold. Any of such data from dataset 535 may comprise seller data 545.

The dataset 535 further has a value RS that includes a unique identifier that contains or identifies information identifying or regarding a revenue source system for revenue received for transaction 597 and the location(s) of one or more properties being rented on the system. The dataset 535 may fewer values or have additional values, as indicated by the dot-dot-dot in the dataset 535. These values may characterize further attributes, such as characteristics of data identifying of or otherwise relating to a license or registration required for the transaction, a date and possibly also time of the transaction 597, and so on.

The digital tax and watermarking rules 570 have been created so as to accommodate tax rules that the set 580 of different tax authorities 581, 582 . . . promulgate within the boundaries of their tax jurisdictions and to indicate when and how to watermark resources, such that external data may be more efficiently and accurately authenticated. In FIG. 5, five sample digital tax and watermarking rules are shown, namely T_RULE2 572, T_RULE3 573, T_RULE5 575, T_RULE6 576 and T_RULE7 577. Additional digital tax and watermarking rules 570 are suggested by the vertical dot-dot-dots. Similarly with FIG. 1, some of these digital tax rules may be digital main rules that determine the tax obligation 579A, while others can be digital precedence rules that determine which of the digital main rules is to be applied in the event of conflict. In some use cases, digital main rules may be about a sales tax or use tax being owed due to the transaction 597 at a certain percentage of the purchase price. Digital precedence rules may be digital tax rules that determine whether particular digital tax rules are to be applied for origin-based or destination-based jurisdictions, how to override for diverse taxability of individual items, for temporary tax holidays, for exemptions from having to pay sales tax based on who the buyer is, and also based on nexus, and so on. In the present example, digital precedence rules may be digital tax or digital watermarking rules that determine whether particular digital tax or digital watermarking rules are to be applied, or particular data is to be digitally watermarked.

Similarly with FIG. 1, these digital tax and watermarking rules 570 can be implemented or organized in different ways. In some use cases they can be organized with conditions and consequents, such as was described earlier in this document. Such conditions may relate to geographical boundaries, sources of revenue, effective dates, and so on, for determining where and when a digital tax rule or tax rate is to be applied. These conditions may be expressed as logical conditions with ranges, dates, other data, and so on. Values of the dataset 535 can be iteratively tested against these logical conditions according to arrows 571. In such cases, the consequents may indicate one or more tax obligations, such as to indicate different types of taxes that are due, rules, rates, exemption requirements, reporting requirements, remittance requirements, etc.

In this example, a certain digital tax rule T_RULE6 576 is shown as identified and used, which is indicated also by the beginning of an arrow 578. Identifying may be performed responsive to the values of the dataset 535, which are shown as considered for digital tax and watermarking rules 570 by arrows 571. For example, it can be recognized that a condition of the digital tax rule T_RULE6 576 is met by one or more of the values of the dataset 535. As such, the computer system 595 may produce the tax obligation 579A and tax return document, which is akin to producing the resource 179A of FIG. 1. The computer system 595 may also file or otherwise send (or cause to be filed or sent) the tax return document to one or more of the applicable tax authorities in the set of tax authorities 580 via network 188. The tax obligation 579A can be produced by the computer system 595 applying the certain digital tax rule T_RULE6 576, as indicated by the arrow 578. In this example, the consequent of the identified certain digital tax rule T_RULE6 576 may specify that a tax is due, the amount is to be determined by a multiplication of the sale price of the value B2 by a specific rate, the tax return form that needs to be prepared and filed, a date by which it needs to be filed, and so on.

The tax and watermarking engine 583 of the OSP 598 electronically performs application of a digital watermark 546 to the computed tax obligation 579A (or to a document including such computed tax obligation) according to one or more digital tax and watermarking rules 570, as indicated by arrow 542. In particular, when and how to perform such digital watermarking, and which digital watermarking technique to use, may be indicated by and performed according to one or more digital tax and watermarking rules 570 stored by or otherwise accessible by the OSP 598. As a result, the tax and watermarking engine 583 generates a digitally watermarked tax obligation 579B, as indicated by arrow 544, such that the computed tax obligation 579A is identifiable via the digital watermark as having been produced by the OSP 598. The OSP 598 may then electronically provide the digitally watermarked tax obligation 579B via a notification 536 to the entity that requested it, such as seller 593. The digital watermarking of the produced resource 579A may be, for example, to enable determination of whether external data suspected of being (or purporting to be) the generated tax obligation 579A is an exact copy of some or all of tax obligation 579A computed and provided by the OSP 598. The OSP 598 may thereby detect unauthorized use of the data generated and provided by the OSP 598 and/or to determine incorrect or otherwise unauthorized attribution of external data to the OSP 598.

In an example embodiment, the computer system 595 causes notification 536 to be transmitted. The notification can include or can be about an aspect of the digitally watermarked tax obligation 579B. Similarly with the notification 136 of FIG. 1, in the example of FIG. 5, the notification 536 is caused to be transmitted by the computer system 595 as an answer to the received dataset 535. In particular, the notification 536 may inform about the aspect of the digitally watermarked tax obligation 579B, namely that it has been determined, where it can be found, what it is, or at least a portion or a statistic of its content, and so on. However, the difference between tax obligation 579A and digitally watermarked tax obligation 579B does not affect the usefulness of the tax obligation 579B provided to the entity that requested it (e.g., seller 593) and may be visually imperceptible or difficult to perceive visually by a human reader. The notification 536 can be transmitted to one of an output device and another device that can be the remote device, from which the dataset 535 was received. The output device may be the screen of a local user or a remote user. The notification 536 may thus cause a desired image to appear on the screen, such as within a Graphical User Interface (GUI) and so on. The other device may be a remote device, as in this example. In particular, the computer system 595 causes the notification 536 to be communicated by being encoded as a payload 537, which is carried by a response 587. The response 587 may be transmitted via the network 188 responsive to the received request 584. The response 587 may be transmitted to the computer system 590, intermediary entity 560 or to OPF 589, and so on. As such, the other device can be the computer system 590, or a device of the OPF 589, or the screen 591 of the user 592, and so on. In this example the single payload 537 encodes the entire notification 536, but that is not required, similarly with what is written above about encoding datasets in payloads. Along with the aspect of the digitally watermarked tax obligation 579B, it is advantageous to embed in the payload 537 the ID value and/or one or more values of the dataset 535. This will help the recipient correlate the response 587 to the request 584, and therefore match the received aspect of the digitally watermarked tax obligation 579B as the answer to the received dataset 535.

FIG. 6 is a sample view of an electronic data structure 600 associating electronic watermark identifiers 602 with respective watermark techniques 604 that they identify in a use case according to various embodiments of the present disclosure, and is an improvement in automated computerized systems. Various different digital watermarking techniques may be used by the OSP 598. Digital watermarking includes any alteration to a resource which does not impact its accuracy. The electronic data structure 600 may be stored in database 594 or other memory accessible by the tax and watermarking engine 583 and indicates examples of such various digital watermarking techniques. However, additional or different digital watermarking techniques may be used in various embodiments.

In an example embodiment, the tax and watermarking engine 583 of the OSP 598 may access the data structure 600 to identify and select a specific technique to use in particular scenarios and apply the technique as indicated in the electronic data structure 600. Computer executable instructions indicating in which circumstances (e.g., on which particular dates and times and on which particular types of produced resources and electronic documents) and how to apply each particular technique may also be indicated in the watermark technique field and/or the digital tax and watermarking rule 570. Also, for each particular digital watermark technique indicated in the data structure 600, the data structure 600 and/or digital tax and watermarking rule 570 may include computer executable instructions for how to verify whether external data includes a digital watermark that resulted from application of the particular digital watermark technique.

In particular, digital watermark technique 1 includes substituting Unicode characters in certain data (e.g., dates or addresses) appearing in the resource produced by the OSP 598. In one embodiment, when the OSP 598 validates and refines an address as part of the tax calculation and address validation services provided by the OSP 598, the OSP 598 may do so in such a way that it is still accurate but also unmistakable as having been touched by algorithms of the OSP 598.

For example, given the original address:
320 S. Houston St.
San Francisco, CA 98212
The OSP 598 generates the perfected address:
320 S . Houston St.
San Francisco, CA 98212
The difference between the two addresses above is that in the second address above, the period after the "S" has been replaced with the Unicode character (U+FE52, Small Full Stop Period) and the second period after the street abbreviation has been replaced with (U+FF0E, Full Width Period). There are three spaces and a tab following the final character. From the perspective of code, they are distinctly different, however, visually they are identical. OSP 598 may construct such flourishes which have no impact on accuracy or break any downstream system, but which are distinctly associated with the OSP 598. The OSP 598 may generate sufficient diversity of such behaviors that addresses provided in the produced resource are watermarked in a way which uniquely identifies the customer (e.g., seller 593) who requested it. In some embodiments, this may be a feature sold to customers so that they could track downstream uses of their own invoices.

In some embodiments, the OSP 598 uses steganographic techniques to stamp invoices returned by the OSP 598 with dates, times, and other unique identifying information such that it can later be reconstructed exactly when the particular invoice was produced and what engine the OSP 598 used to calculate a particular invoice. Further examples include the OSP 598 proving that a company was using a service of the OSP 598 without authorization (e.g., paying for it). In one embodiment, the OSP 598 introduces enough bits of noise into an address such that it is identifiable from the shipping label on a package that the contents had been processed by an e-commerce system connected to the OSP 598.

Watermark Technique 2 includes substituting Unicode characters in tax codes. In this technique, the tax and watermarking engine 583 subtly alter things like tax codes generated particularly by the OSP 598 that are unique to the OSP 598. For example, when a customer submits tax code:
P00000001
As the tax code, the tax and watermarking engine 583 may return:
P00000001
Again, the above codes are visually identical but in the second instance the opening letter 'P' has been replaced with the Unicode Mathematical San-Serif Capital P (U+0050)

The tax and watermarking engine 583 learns to treat both codes above identically, however, receiving the second one in external data would be an indicator that the OSP 598 is recalculating something the OSP 598 has previously calculated.

Watermark Technique 3 includes adjusting dates by an inconsequential amount of time. In particular, adjusting dates by an inconsequential amount of time herein means adjusting dates in a manner that does not affect the usefulness of the produced resource to the entity that requested it (e.g., seller 593) and may be difficult to perceive visually by a human reader. In various embodiments, the tax and watermarking engine 583 may digitally watermark the produced resource by adjusting an inconsequential fractional or decimal value indicated in the produced resource and/or by adjusting a binary value representing the produced resource.

For example, in some embodiments, all invoices have a date field. Dates are usually stored internally in computer systems as a "datetime" datatype and then rendered into a specific date format at runtime. Virtually all invoices only use the date but the time data is accompanying the date anyway. Below is an example of two visually identical but different dates in Microsoft Excel® rendered in date, date+time, and decimal formats:

| | | |
|---|---|---|
| Jan. 8, 2021 | Jan. 8, 2021 12:00 AM | 44,204.00000000 |
| Jan. 8, 2021 | Jan. 8, 2021 12:01 AM | 44,204.00069444 |

In the above example watermarking technique, the tax and watermarking engine 583 always adds one minute to every "datetime" as a way of distinctly identifying the OSP 598 as having touched the data, but with a likely harmless effect on downstream uses. The amount of time added may vary in other examples, and are typically inconsequential or alters the data in a manner that does not impact its accuracy. For example, the tax and watermarking engine 583 may instead always add 3.5 nanoseconds to every "datetime" as a way of distinctly identifying the OSP 598 as having touched the data. The amount of the intentional error may be varied to convey different types of information. In one embodiment, the error may be slightly different on the several different dates on an invoice such that the cumulative adjustments added together creates a more complex indicator, such as the unique identifier to lookup a particular calculation in the electronic log files of the OSP 598.

Watermark Technique 4 includes adjusting currency amounts by less than currency relevant amounts. In an example embodiment, most taxes are shown as dollars and cents, but those values are stored internally as floating point data types generally with very high precision possible. For example: $42.57 and $42.5700000000001

Both will be displayed as $42.57 in most ERP systems, but are distinctly different from a data perspective. This intentional error inserted using the present example watermarking technique is unlikely to accumulate sufficiently in summing operations to cause a subsequent rounding problem. However, it is likely to be blindly copied from system to system downstream of the OSP 598 producing the digitally watermarked tax obligation 579B since almost all systems store these kinds of values the same way. An example use case for this is the OSP 598 providing a free tax service, the present example digital watermarking technique being used as a way of identifying free calculations from paid calculations.

Watermark Technique 5 includes adjusting geo-coordinates with an intentional error. One of the tax calculation techniques of the OSP 598 is "rooftop accuracy". This is achieved by converting all addresses to latitude and longitude internally or by the customer (e.g., seller 593) directly supplying the latitude and longitude of an origin or destination in their request. Using the present example digital watermarking technique, the tax and watermarking engine 583 introduces intentional errors into the geo-coordinate calculation performed by the tax and watermarking engine 583. For instance, the digital watermark may be that all coordinates are always moved 3 inches west and 2 inches north and 5 inches up in altitude. In an example embodiment, the tax and watermarking engine 583 always ensures that this movement is an equivalent tax jurisdiction to the original unaltered calculation to ensure accuracy. The digital watermarking technique also always translates 2 dimensional coordinates into 3 dimensional coordinates. Since virtually all customers (e.g., seller 593) only supply latitude and longitude, the addition of altitude is relatively harmless but the default altitude could be a unique value associated with the OSP 598 (e.g., the altitude of a particular office building associated with the OSP 598).

Watermark Technique 6 includes generating a cryptographic code based on the produced resource. For example, the tax and watermarking engine 583 may generate a cryptographic code based on the produced resource, such as a hash of some selected portion of the produced resource or some other cryptographic code based on using a private key to encrypt a selected portion of the produced resource. At least a portion of the resulting hash or the result of some other encryption with a private key may be used to generate a code. The tax and watermarking engine 583 then digitally watermarks the produced resource by electronically embedding the cryptographic code in the produced resource by including the code in the produced resource or slightly altering the produced resource in an inconsequential manner based on the generated cryptographic code. It will be appreciated that Watermark Technique 6 can be used to extend or enhance Watermark Techniques 3, 4 and 5. In one embodiment, including the cryptographic code embedded in the produced resource alters a selected portion of the produced resource in a manner that does not affect the usefulness of the produced resource to the entity that requested it (e.g., seller 592). For example, a time associated with a date included in the produced resource may be adjusted by an amount of nanoseconds equal to the 10 first bits of the hash of the date included in the produced resource, or the 10 first bits of the hash may otherwise be embedded in the produced resource. What portion of the generated code to use may be selectable and vary in different embodiments.

Then, external data may be checked by the tax and watermarking engine 583 to determine whether the cryptographic code is embedded in the external data, for example, by checking for specific values in the external data based on alterations made using the cryptographic code to resources produced by the OSP 598 that are unique to the watermarking technique that had been applied by the OSP 598. In the example provided above, the date provided in the external data would be checked to determine if it included a time value indicating it had been adjusted by an amount of nanoseconds equal to the 10 first bits of the hash of the date originally included in the produced resource.

In addition to the examples already provided above, the digital watermarking techniques described herein may be used to guard against competitors of the OSP 598 secretly using the service of the OSP 598 to improve the accuracy of their own calculations by leaving an identifying distortion in the data that is too small to be noticed by many downstream systems. The digital watermarking techniques may also be a means to authenticate a data owner.

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C #, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, including:
   at least one processor; and
   a memory coupled to the at least one processor, the memory storing instructions that, when executed by the at least one processor, cause the system to perform operations including:
     storing a plurality of resource digital rules used for producing resources for respective relationship instances of primary entities with other entities;
     an online software platform (OSP) producing a resource based on applying one or more of the plurality of resource digital rules; and
     digitally watermarking the produced resource with a digital watermark such that the produced resource is identifiable via the digital watermark as having been produced by the OSP.

2. The system of claim 1 in which the digitally watermarking the produced resource includes:
   electronically updating an electronic log associating the digital watermark with a date and time the digitally watermarking occurred.

3. The system of claim 2 in which the digitally watermarking the produced resource further includes:
   generating metadata including an identification of the digital watermark and associating the digital watermark with the produced resource; and
   the OSP storing the generated metadata for future reference by the OSP.

4. The system of claim 3 in which the instructions, when executed by the at least one processor, further cause the system to perform operations including:
   electronically receiving external data from a source other than the OSP;
   electronically determining whether the external data includes the digital watermark based on one or more of: the generated metadata and the electronic log; and
   electronically determining whether the external data is an exact copy of some or all of the produced resource based on the determination whether the external data includes the digital watermark.

5. The system of claim 4 in which the instructions, when executed by the at least one processor, further cause the system to perform operations including:
   electronically determining that the external data is an exact copy of some or all of the produced resource based on a determination that the external data includes the digital watermark; and
   determining unauthorized use of the produced resource based on the determination that the external data is an exact copy of some or all of the produced resource.

6. The system of claim 4 in which the instructions, when executed by the at least one processor, further cause the system to perform operations including:
   electronically determining that the external data is purported to be the produced resource and is attributed to the OSP;
   electronically determining that the external data is not an exact copy of the produced resource based on a determination that the external data does not include the digital watermark; and determining unauthorized attribution of the external data to the OSP based on the determination that the external data is not an exact copy of the produced resource.

7. The system of claim 4 in which the electronically determining whether the external data includes the digital watermark includes:

electronically reading the generated metadata to determine watermarks identified in the generated metadata; and determining whether one or more watermarks identified in the generated metadata, including the digital watermark, is included in the external data.

8. The system of claim 4 in which the electronically determining whether the external data includes the digital watermark includes:

determining a date and time indicating when the external data was originally generated;

electronically reading the electronic log associating the digital watermark with the date and time the digitally watermarking occurred;

determining a match between the date and time indicating when the external data was originally generated and the date and time the digitally watermarking occurred; and in response to determining the match between the date and time indicating when the external data was originally generated and the date and time the digitally watermarking occurred, determining whether the external data includes the digital watermark.

9. The system of claim 1 in which the digitally watermarking the produced resource includes:

digitally watermarking the produced resource by substituting Unicode characters in certain data indicated in the produced resource.

10. The system of claim 1 in which the digitally watermarking the produced resource includes:

digitally watermarking the produced resource by substituting Unicode characters in tax codes indicated in the produced resource.

11. The system of claim 1 in which the digitally watermarking the produced resource includes:

digitally watermarking the produced resource by adjusting dates indicated in the produced resource by an inconsequential amount of time.

12. The system of claim 1 in which the digitally watermarking the produced resource includes:

digitally watermarking the produced resource by adjusting geo-coordinates indicated in the produced resource with an intentional error.

13. The system of claim 1 in which the digitally watermarking the produced resource includes:

generating a cryptographic code based on the produced resource; and digitally watermarking the produced resource by electronically including the cryptographic code embedded in the produced resource.

14. The system of claim 13 in which the cryptographic code is a hash value based on at least one portion of the produced resource.

15. The system of claim 13 in which the including the cryptographic code embedded in the produced resource alters at least one portion of the produced resource in a manner that does not affect the usefulness of the produced resource to the primary entity.

16. The system of claim 1 in which the digitally watermarking the produced resource includes:

digitally watermarking the produced resource by adjusting an inconsequential fractional value indicated in the produced resource.

17. The system of claim 1 in which the digitally watermarking the produced resource includes:

digitally watermarking the produced resource by adjusting a binary value representing the produced resource.

* * * * *